United States Patent [19]

Haapakoski

[11] Patent Number: 5,237,261
[45] Date of Patent: Aug. 17, 1993

[54] VOLTAGE STEP UP REGULATOR

[75] Inventor: Arto Haapakoski, Äänekoski, Finland

[73] Assignee: Telenokia OY, Espoo, Finland

[21] Appl. No.: 784,442

[22] PCT Filed: May 7, 1990

[86] PCT No.: PCT/FI90/00123
§ 371 Date: Nov. 8, 1991
§ 102(e) Date: Nov. 8, 1991

[87] PCT Pub. No.: WO90/13938
PCT Pub. Date: Nov. 15, 1990

[51] Int. Cl.$^5$ .................. G05F 1/56; H02M 3/155
[52] U.S. Cl. ........................ 323/282; 323/222; 363/21; 363/97; 330/270; 330/290
[58] Field of Search ............... 363/18–21, 363/22–25, 95, 97; 323/222, 223, 282; 330/262, 264, 265, 269–271, 277, 282, 290, 291, 297

[56] References Cited

U.S. PATENT DOCUMENTS 3,944,908  3/1976  Oki ............................ 321/15
4,237,425 12/1980  Spiegel ....................... 330/263
4,336,504  6/1982  Seki et al. .................. 330/274

FOREIGN PATENT DOCUMENTS 0129181 12/1984 European Pat. Off. .
2022708 11/1971 Fed. Rep. of Germany .
61-22756  1/1986 Japan .
61-277367 12/1986 Japan .

Primary Examiner—Emanuel T. Voeltz
Assistant Examiner—Adolf Berhane
Attorney, Agent, or Firm—Cushman, Darby & Cushman

[57] ABSTRACT

A voltage step-up regulator produces a frequency control voltage for a frequency synthesizer in a radio transmitter using a low operating voltage. To minimize the disturbances conveyed elsewhere in the radio device, the step-up regulator comprises an amplifying transistor controlled by an oscillator signal which operates as a class A amplifier, the output of amplifying transistor (Q1) including a diode and two selectively coupled capacitors for rectifying and filtering the amplified signal. The step-up regulator further comprising a feedback circuit for stabilizing the output voltage by adjusting the amplitude of the amplified signal.

9 Claims, 1 Drawing Sheet

VOLTAGE STEP UP REGULATOR

BACKGROUND OF THE INVENTION

1. Field of the Invention

The invention relates to a voltage step up regulator for producing a frequency control voltage for a frequency synthesizer in a radio transmitter from a low operating voltage.

2. Description of the Related Art

In a traditional frequency synthesizer formed by a phase-locked loop, frequency is usually produced by oscillators controlled by capacitance diodes. Conventional circuits include the Collpits and its various modifications. To save space and costs, the oscillator is operated at a so-called final frequency while the transmitter oscillator is frequency-modulated through a control voltage. It is desirable that this kind of oscillator can be adjusted within a frequency range as wide as possible with one and the same control voltage.

To widen the adjustable frequency range without increasing the control voltage range, the ratio of the change of frequency to the change of the control voltage has to be increased.

The problem is that noise occurring in the control voltage also modulates the carrier wave to a relatively greater degree than previously. This, in turn, results in a reduction in the signal-to-noise ratio of the radio transmission. Noise occurring in the control voltage may be caused by several different sources and it is difficult to filter. With low-frequency noise, the filtration is especially difficult to carry out.

Another way of widening the adjustable frequency range of the frequency synthesizer is to increase the control voltage range. However, portable radio devices have to use accumulators as a source of power, the typical accumulator voltage being about 12 V. Losses caused by various filter and regulator circuits further decrease the applicable dc voltage. However, a control voltage of about 12 V is insufficient for the control of the frequency synthesizer within a wide frequency range.

In prior art solutions, attempts have been made to increase such low operating voltages by circuits realized by conventional switched mode power supplies. A switched mode circuit usually operates at a frequency between 10 to 100 kHz. False signals, i.e. low-frequency noise, occuring in non-linear switched mode circuits are easily propagated in the circuits of the radio device, being summed to the intermediate and low-frequency signals.

Noise also occurs in the frequency control voltage of the frequency synthesizer, which further impairs the signal-to-noise ratio of the system. In an attempt to reduce the noise caused by the switched more circuit, the circuit has been realized by a separate hybrid, it has been positioned in a metallic casing, and the operating frequency of the circuit has been selected suitably with a frequency range between the radio channels such that it has not been taken into account in the specifications of the system.

Accordingly, the prior art switched mode circuits impair the properties of the radio device and take quite a lot a space, which is more and more inconvenient with ever decreasing device sizes.

SUMMARY OF THE INVENTION

The object of the present invention is to provide a voltage step up regulator which avoids the problems of the prior art. This as well as the other objects of the invention are achieved by means of a voltage step up regulator.

The basic idea of the invention is to amplify a high-frequency signal by means of an amplifier operating linearly in class A, to raise the dc level of the amplified signal by a level lock or a similar dc level shifting circuit, and to adjust the control voltage of the regulator to a desired value. The output voltage is preferably adjusted by means of a feedback using as a reference voltage a stabilized lower voltage existing in the frequency synthesizer. The invention avoids the problems of the prior art, because it does not produce harmonic or other low-frequency noise components in the frequency synthesizer or in the adjacent circuits.

As the amplifier is controlled by a sinusoidal signal, a single high-frequency component is formed which is easy to filter out of the output voltage. The output voltage of the regulator is thus very pure, in addition to which the low-frequency components to which the voltage is applied, inherently attenuate such a high-frequency signal.

Therefore, the metallic casing used previously can be omitted and the regulator coupling of the invention can be integrated in the same circuit board as the other couplings, or it can be realized by an integrated circuit.

Also, the size and the manufacturing cost of the regulator of the invention can be decreased since the reference oscillator of the frequency synthesizer can be utilized as a signal source. Due to the high operating frequency of the regulator, coils and capacitors of smaller electrical and mechanical size than previously can be used. The small components are also more advantageous and enable the use of surface-mounted components and automatic assembling. This, in turn, shortens the production time and reduces production cost.

By means of the invention, a traditional narrow-band synthesizer can operate within a wider frequency range because the control voltage has a larger range of operation and because the range of operation of the control voltage is on a higher level than previously, as a result of which the operating point of the capacitance diodes, too, is within a more linear range. As a consequence, the deviation and the signal-to-noise ratio of a transmitter modulated through the control voltage remain more even over the entire frequency range.

BRIEF DESCRIPTION OF THE DRAWINGS

In the following the invention will be described in more detail by means of an embodiment with reference to the attached FIG. 1, which shows a circuit diagram for a voltage step up regulator of the invention.

DETAILED DESCRIPTION OF THE PREFERRED EMBODIMENT

Figure 1:
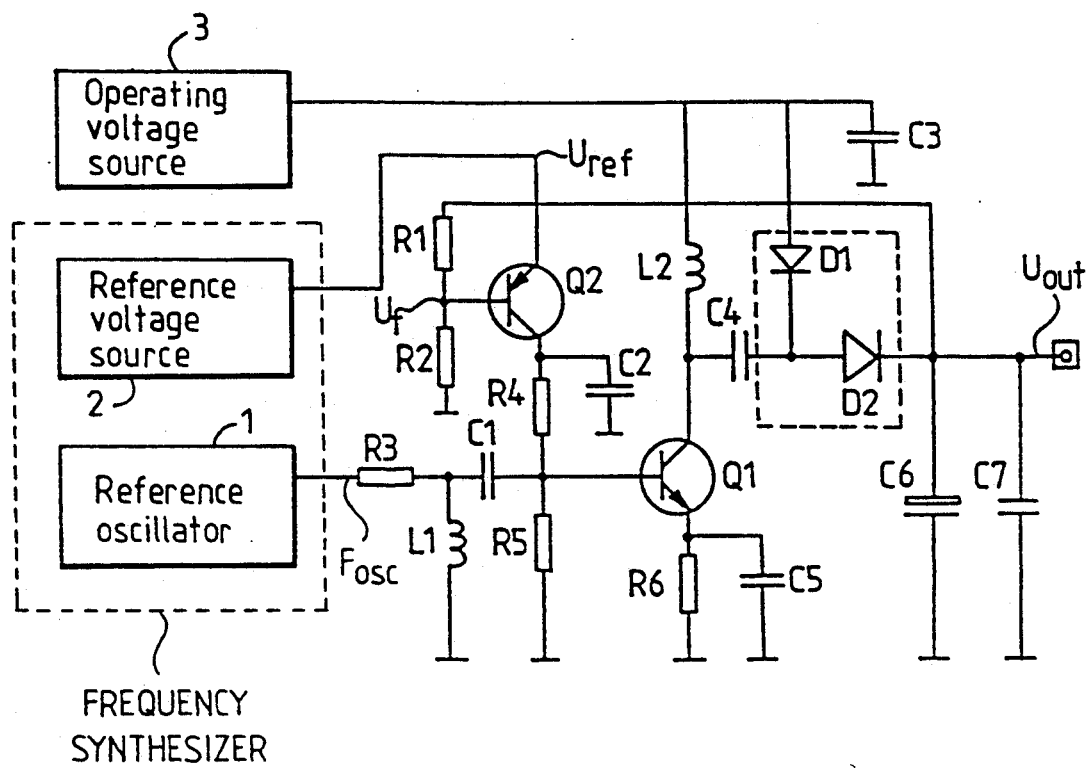

The regulator of FIG. 1 comprises an amplifier operating in class A and being formed by a transistor Q1. The operating point of the transistor Q1 is set by biasing the base electrode of the transistor Q1 by means of a voltage divider formed by resistors R4 and R5.

The stabilization of the dc operating point is performed by means of an emitter resistor R6. A capacitor C5 connected in parallel with resistor R6 couples transistor Q1 to earth at the operating frequency of the transistor emitter.

The collector of transistor Q1 is connected to an operating voltage through a coil L2 which acts as a high inductive impedance at the operating frequency of the transistor Q1.

A capacitor C3, connected between earth and an end of the coil L2 which is connected to operating voltage source 3, couples coil L2 to earth at the operating frequency.

From a reference oscillator 1 of the frequency synthesizer, a preferably sinusoidal control signal having a frequency of about 12 MHz in this specific case is applied to the base of the transistor Q1 through an impedance matching circuit formed by a resistor R3, a coil L1 and a capacitor C1. The purpose of the impedance matching circuit is to match the input of the amplifier with the output of the oscillator 1 to achieve an appropriate conjugate matching for amplification.

A level lock or a charge injection device formed by a capacitor C4 and a diode D1 is connected to the collector electrode of the transistor Q1. The level lock or charge injection device raises the dc voltage level of the amplified sinusoidal signal by one half of the amplitude of a sinusoidal signal. The capacitor C4 and the diode D1 are connected in series between the collector of the transistor Q1 and operating voltage source 3 in such a way that the anode of diode D1 is connected to operating voltage source 3 and the cathode to capacitor 4.

The connection point between diode D1 and capacitor C4 is connected to the anode of a diode D2 acting as a half-wave rectifier while the cathode of the diode D2 is connected to filtration capacitors C6 and C7.

The level lock circuit operates in the following way. During the negative semi-cycle of the amplified sinusoidal signal occuring at the collector of the transistor Q1, the diode D1 is conductive while the diode D2 is nonconductive, whereby the capacitor C4 is charged by the operating voltage through the diode D1. During the positive semi-cycle of the sinusoidal signal, diode D1 is non-conductive and the diode D2 is conductive, whereby the charge of the capacitor C4 is transferred through the diode D2 to the capacitors C6 and C7. At the same time the charge of the capacitor C4 is discharged to some extent. As a result of the operation of the level lock, the dc level of the sinusoidal signal between the capacitor C4 and the diode D1 exceeds the dc level in the collector if the transistor Q1 comprising no level lock approximately by the peak-to-peak voltage of the sinusoidal signal. For instance, at an operating voltage of about 12 V, the dc level of the sinusoidal signal at the connection point between the diode D1 and the capacitor C4 is about 15 V and the peak-to-peak voltage about 6 V, whereby the output voltage Vout after the half-wave rectification and filtration is about 18 V.

The half-wave rectified signal formed by the diode D2 is filtered with the high capacitance of the capacitor C6, whereby a substantially stable dc voltage Vout is formed in the output of the regulator. The capacitor C7, in turn, acts as a coupling capacitor at the operating frequency and passes the operating-frequency signal component present in the output voltage Vout to the earth.

The feedback formed by the transistor Q2 and the resistor R1 and R2 stabilizes the output voltage to an appropriate value and controls the operating point of the transistor Q1 so that the power consumption of the whole circuit is minimized in accordance with the load.

The output voltage Uout is connected through the voltage divider formed by the resistors R1 and R2 to the base of the PNP transistor Q2.

The collector of transistor Q2 is connected to resistor R4 of the voltage divider biasing transistor Q1. The emitter of transistor Q2 is connected to Uref source 2 of 9 reference voltage, such as a stabilized voltage existing in the frequency synthesizer circuit.

The transistor Q2 compares the reference voltage Uref at its emitter with an output voltage Uout set for the resistors R1 and R2. If the voltage Uout is below the set value, a voltage $U_F$ in the base of the transistor Q2 is reduced, so that a current through the transistor increases. As a result, the collector voltage of the transistor Q2 rises, thus increasing the potential of the base of the transistor Q1 through the resistors R4 and R5. The idle current and amplification of the transistor Q1 thereby increase, thus increasing the amplitude of the sinusoidal wave occurring in the collector. This, in turn, causes an increase in the output voltage towards the set value.

If the output voltage Uout is too high, the operation of the feedback is reversed.

The output voltage Uout is set by means of the resistors R1 and R2 in the following way:

$$Uout = [(Uref - Ueb)(R2 + R1)]/R2$$

where Ueb is the base-emitter voltage of the transistor Q2.

The source 3 of an operating voltage is preferably an accumulator 3.

In place of the reference oscillator signal of the frequency synthesizer, the control signal of the transistor Q1 may be a purpose-made control signal of sufficiently high frequency. An additional oscillator, however, increases the number of components and increases the size of the circuit, in addition to which a separate oscillator and the high-frequency signal produced by it form a further source of noise.

The preferred embodiment described above provides a very simple and advantageous voltage regulator with efficient operation. However, the amplifier, the level lock, the rectifier or the feedback, for instance, can be realized in some other way without deviating from the ideal of the invention.

The figure and the description related to it are also in other respects intended merely to illustrate the present invention. In its details, the voltage step up regulator of the invention may vary within the scope of the attached claim.

I claim:

1. A step-up generator for generating a frequency control signal for a frequency synthesizer, said step-up generator comprising:
   means for receiving an externally provided source operating voltage, said frequency control signal having a dc voltage higher than said source operating voltage;
   dc level shifting means for raising a dc level of an amplified reference oscillator signal output from said class A amplifying means;
   means for rectifying and filtering an output from said dc level shifting means to generate said frequency control signal; and
   feedback means for stabilizing said frequency control signal by controlling an amplification bias of said class A amplifying means.

2. The step-up generator of claim 1, wherein said step-up generator and frequency synthesizer are for use in a radio transmitter.

3. The step-up generator of claim 2, wherein said radio transmitter is an integrated circuit.

4. The step-up generator of claim 1, wherein said dc level shifting means includes a level lock circuit coupled to an output of said class A amplifying means.

5. The step-up generator of claim 4, wherein said level lock comprises a series connected capacitive portion and a unidirectionally conducting semiconductor portion, said level lock circuit being connected at one end of said capacitive portion to the source operating voltage and at one end of said unidirectionally conducting semiconductor portion to the output with said class A amplifying means, a connection point between said capacitive portion and said unidirectionally conducting semiconductor portion corresponding to an output point of said level lock circuit.

6. The step-up generator of claim 1, wherein said feedback means is coupled to a constant voltage reference source.

7. The step-up generator in any one of claims 1 to 6, wherein said class A amplifying means includes a transistor whose collector is coupled to the source operating voltage through an inductive coil having a high impedance at the operating frequency of the transistor, said feedback means adjusting the amplification bias of said transistor.

8. The step-up generator of any one of claims 7 to 6, wherein said class A amplifying means comprises an impedance matching circuit and a class A amplifying stage, said impedance matching circuit matching the reference oscillator signal with an input to the class A amplifying stage.

9. The step-up generator of claim 8, wherein said class A amplifying stage includes a transistor whose collector is coupled to the source operating voltage through inductive coil having a high impedance at the operating frequency of the transistor, the base of said transistor being coupled to an output of said impedance matching circuit and to said feedback means, said feedback means adjusting the amplification bias of said transistor.

* * * * *

UNITED STATES PATENT AND TRADEMARK OFFICE
CERTIFICATE OF CORRECTION

PATENT NO. : 5,237,261
DATED : AUGUST 17, 1993
INVENTOR(S) : Arto HAAPAKOSKI It is certified that error appears in the above-identified patent and that said Letters Patent is hereby corrected as shown below:

<u>IN COLUMN 4 CLAIM 1</u>

Column 4 Claim 1 Line 59 after "voltage;" insert new paragraph

"class A amplifying means for amplifying a reference oscillator signal from a reference oscillator;"

Signed and Sealed this

Eighth Day of March, 1994

*Attest:*

BRUCE LEHMAN

*Attesting Officer*     *Commissioner of Patents and Trademarks*